United States Patent
Dalal et al.

(10) Patent No.: US 7,474,790 B2
(45) Date of Patent: Jan. 6, 2009

(54) MULTISCALE DETECTION OF LOCAL IMAGE STRUCTURES

(75) Inventors: Navneet Dalal, Montbonnot (FR); Dorin Comaniciu, Princeton Jct., NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 834 days.

(21) Appl. No.: 10/953,804

(22) Filed: Sep. 29, 2004

(65) Prior Publication Data
US 2005/0129317 A1    Jun. 16, 2005

Related U.S. Application Data

(60) Provisional application No. 60/508,081, filed on Oct. 2, 2003.

(51) Int. Cl.
*G06K 9/62* (2006.01)

(52) U.S. Cl. ............... 382/225; 382/190; 382/226; 704/245; 707/E17.089

(58) Field of Classification Search .......... 706/12, 706/14, 46, 45; 704/231, 243, 245; 707/1, 707/6, 4, 5, 3, E17.089, E17.08, E17.086, 707/E17.083, 317.085; 382/225, 224, 128, 382/100, 190, 288, 226; 544/350
See application file for complete search history.

(56) References Cited

U.S. PATENT DOCUMENTS

| | | | |
|---|---|---|---|
| 6,430,430 B1 * | 8/2002 | Gosche | 600/410 |
| 7,031,523 B2 * | 4/2006 | Comaniciu et al. | 382/190 |
| 7,187,788 B2 * | 3/2007 | Simon et al. | 382/118 |
| 7,212,657 B2 * | 5/2007 | Simon et al. | 382/118 |
| 2003/0068082 A1 | 4/2003 | Comaniciu et al. | 382/162 |

OTHER PUBLICATIONS

Comaniciu et al., "Mean shift: A robust approach toward feature space analysis", IEEE Trans. Pattern Analysis Machine Intelligence, May 2002, vol. 24, No. 5, pp. 603-619.

Chen et al., "Estimation of symmetric positive-definite matrices from imperfect measurements", IEEE Transactions on Automatic Control, Oct. 2002, vol. 47, No. 10, pp. 1721-1725.

(Continued)

*Primary Examiner*—Sheela C Chawan
(74) *Attorney, Agent, or Firm*—Donald B. Paschburg; F. Chau & Associates, LLC

(57) ABSTRACT

A method and apparatus for the detection of local image structures represented as clusters in a joint-spatial range domain where the method comprises receiving an input image made having one or more clusters in a joint-spatial range domain, and each of the one or more clusters having a corresponding mode. Receiving a set of analysis matrices and selecting through each one of the analysis matrices. Using the selected analysis matrix to partition the input image into the one or more clusters and their corresponding modes, and computing a mean, $\mu$, and a local covariance matrix $\Sigma$ for each of the corresponding modes of each of the one or more clusters. Selecting at least one of the one or more clusters, where each selected cluster has a stable mean and stable covariance matrix across the set of analysis matrices, whereby each of the selected clusters is indicative of a local image structure.

22 Claims, 6 Drawing Sheets

OTHER PUBLICATIONS

Dementhon, "Spatio-temporal segmentation of video by hierarchical mean shift analysis", Proceedings of the Statistical Methods in Video Processing Workshop, Monash University, Clayton, Vic., Australia, 2002, pp. 115-120.

Yixin Chen, et al., "Estimation of Symmetric, Positive Definite Matrices From Imperfect Measurements" Nov. 2, 2001, pp. 1-13.

Dorin Comaniciu, et al., "Mean Shift: A Robust Approach Toward Feature Space Analysis" pp. 1-17, *IEEE* Transaction on Pattern Analysis and Machine Intelligence, vol. 24, No. 5, May 2002.

Dorin Comaniciu, "An Algorithm for Data-Driven Bandwidth Selection", pp. 1-7, *IEEE* Transaction of Pattern Analysis and Machine Intelligence, vol. 25, No. 2, Feb. 2003.

Christopher Wren, et al., "Pfinder: Real-Time Tracking of the Human Body," pp. 1-7, *IEEE* Transaction of Pattern Analysis and Machine Intelligence, Jul. 1997, vol. 19, No. 7, pp. 780-785.

\* cited by examiner

MULTISCALE DETECTION OF LOCAL IMAGE STRUCTURES

CROSS REFERENCE TO RELATED UNITED STATES APPLICATIONS

This application claims priority from "Multiscale Detection of Local Image Structures", U.S. Provisional Application No. 60/508,081 of Comaniciu, et. al., filed 2 Oct. 2003, the contents of which are incorporated herein by reference.

BACKGROUND OF THE INVENTION

1. Technical Field

The present invention relates to image analysis, more specifically to the detection of local image structures as clusters in the joint spatial-range domain.

2. Discussion of Related Art

Current systems for the detection of image structures, based on expectation maximization algorithms, are not effective unless there is a priori information about the existing number of clusters. In general the more clusters that exist in the dataset of an image the more difficult it is to retrieve them.

SUMMARY OF THE INVENTION

An exemplary embodiment of the current invention includes a method for detection of local image structures represented as clusters in a joint-spatial range domain. The method comprises receiving an input image made having one or more clusters in a joint-spatial range domain, and each of the one or more clusters having a corresponding mode. Receiving a set of analysis matrices and selecting through each one of the analysis matrices. Using the selected analysis matrix to partition the input image into the one or more clusters and their corresponding modes, and computing a mean, $\mu$, and a local covariance matrix $\Sigma$ for each of the corresponding modes of each of the one or more clusters. Selecting at least one of the one or more clusters, where each selected cluster has a stable mean and stable covariance matrix across the set of analysis matrices, whereby each of the selected clusters is indicative of a local image structure.

Another exemplary embodiment of the current invention includes a method as defined above, wherein the step of using the selected analysis matrix to partition the input image comprise computing a plurality of mean shift vectors using the selected analysis matrix. Partitioning the input image into the one or more clusters using the plurality of mean shift vectors, the selected analysis matrix and a mean shift procedure.

Another exemplary embodiment of the current invention includes a method as defined earlier, wherein the step of computing a plurality of mean shift vectors using the selected analysis matrix comprises calculating each mean shift vector using the following equation $$m(x; H) = \frac{\sum_i w_{x_i}(x; H) x_i}{\sum_i w_{x_i}(x; H)} - x$$

where m(x, H) is the mean shift vector calculated at a point vector x of the input image, H is the selected analysis matrix, vector $x_i$ represents a data point that makes up the input image, i is an index representing all the data points in the input image, $w_{x_i}(x, H) = \Phi(x-x_i, H)v(x_i)$, $\Phi$ is the D-dimensional Gausian kernel, and $v(x_i)$ is a weight associated with the point $x_i$.

Another exemplary embodiment of the current invention includes a method as defined earlier, wherein selecting at least one of the one or more clusters comprises building a mode tree with at least one branch, wherein each leaf represents each of the modes of the one or more clusters. Each of the leaves also having the mean $\mu$ and the covariance matrix $\Sigma$ associated with the mode. Selecting each branch of the mode tree one at a time, and for each selected branch defining a set of Gaussian distributions $p_1 \ldots p_K$ from the corresponding($\mu_1$, $\Sigma_1$) $\ldots$ ($\mu_K, \Sigma_K$) associated with each one of the leaves that make up the branch. Selecting the ($\mu, \Sigma$) corresponding to a stable distribution of $p_1 \ldots p_K$ Then selecting the cluster associated with the stable mean $\mu$ and the stable covariance $\Sigma$.

Another exemplary embodiment of the current invention includes a method as defined earlier wherein, selecting the ($\mu, \Sigma$) corresponding to a stable distribution of $p_1 \ldots p_K$ comprises Selecting the ($\mu, \Sigma$) corresponding to a minimum Jensen-Shannon divergence between neighboring Gaussian distributions. The Jensen-Shannon divergence is calculated using the equation $$JS(p_1 \ldots p_J) = \frac{1}{2}\log\frac{\left|\frac{1}{J}\sum_{j=1}^{J}\Sigma_j\right|}{\sqrt[J]{\prod_{j=1}^{J}|\Sigma_j|}} + \frac{1}{2}\sum_{j=1}^{J}(\mu_j - \mu)^T\left(\sum_{j=1}^{J}\Sigma_j\right)^{-1}(\mu_J - \mu)$$

where $p_1 \ldots p_J$ are the neighboring Gausian distributions, J is the number of the neighboring Gausian Distributions, vector $\mu_J$ is the mean associated with the Gaussian distribution, matrix $\Sigma_J$ is the covariance of the Gaussian distribution and the vector $\mu$ representing the average of all the means associated with the neighboring Gaussian distributions.

BRIEF DESCRIPTION OF THE DRAWINGS

FIG. 3a is a flow diagram illustrating an exemplary "Evaluate ($\mu, \Sigma$) for each partition" Block in accordance with FIG. 2;

FIG. 3b is a flow diagram illustrating an exemplary "Cycle through each cluster u of the partitioned data" Block in accordance with FIG. 3a;

FIG. 4a is a flow diagram illustrating an exemplary "Select clusters with stable ($\mu, \Sigma$) across all analysis matrices $H_k$" Block in accordance with FIG. 2;

FIG. 4b is a flow diagram illustrating an exemplary "Cycle through each tree branch from bottom up" Block in accordance with FIG. 4a;

FIG. 5b is a set of images depicting exemplary results from an exemplary embodiment of the current invention that analyzed the Figure of 5a.

DETAILED DESCRIPTION OF PREFERRED EMBODIMENTS

Exemplary embodiments of the present invention provide methods and apparatus for multiscale analysis and detection of local image structures represented as clusters in the joint spatial-range domain, $R^D$. For example, in gray-level images the joint domain is 3D, two dimensions for the image lattice and one for the image intensity. As another example, in color images the joint domain is 5D, two dimensions for the image lattice and three for the color information. In the case of multispectral images, for example from a satellite, the joint domain would be 2+N D, two dimensions for the image lattice plus N dimensions for the N wavelength intervals used to create the image. The local image structures are modeled as normal clusters in the joint-domain and a robust procedure to determine the mean and covariance of each cluster is employed. Clusters, with the most stable mean and covariance across a tree of the modes is selected, where the stability can be measured based on Jensen-Shannon divergence.

Figure 1:
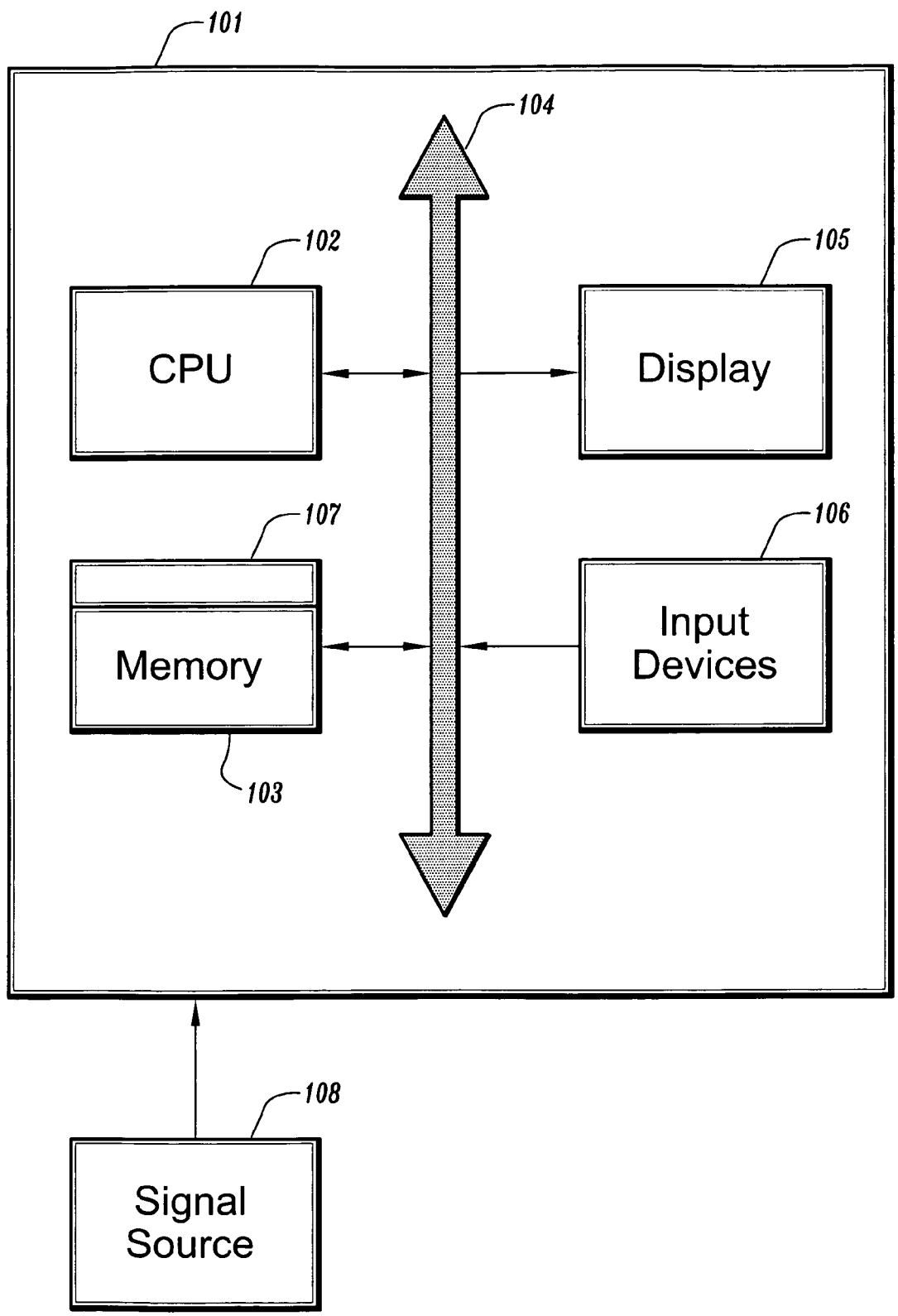
FIG. 1 is a schematic diagram illustrating an exemplary embodiment of a computer system.

Referring to FIG. 1, according to an exemplary embodiment of the present invention, a computer system 101 for implementing the present invention includes a central processing unit ("CPU") 102, a memory 103 and an input/output ("I/O") interface 104. The computer system 101 is generally coupled through the I/O interface 104 to a display 105 and various input devices 106 such as a mouse, keyboard, and medical imaging devices. The support circuits can include circuits such as cache, power supplies, clock circuits, and a communications bus. The memory 103 can include random access memory ("RAM"), read only memory ("ROM"), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer system 101 also includes an operating system and microinstruction code. The various processes and functions described herein may either be part of the microinstruction code or part of the application program (or a combination thereof), which is executed via the operating system. In addition, various other peripheral devices may be connected to the computer platform, such as an additional data storage device and a printing device.

In at least one embodiment of the present invention a D-dimensional Gaussian kernel $\Phi: R^D \to R$ and can be represented as $$\Phi\left(x; \mu, \sum\right) = \frac{1}{(2\pi)^{D/2} \sum^{1/2}} \exp\left(-\frac{1}{2}(x-\mu)^T \sum\nolimits^{-1}(x-\mu)\right) \quad (1)$$

where R is a set of D-dimensional points in the space $R^D$, $\mu$ is a vector that represents the mean, $\Sigma$ is a matrix that represents the fully parameterized covariance matrix and x is a vector representing points in the joint spatial-range domain. If $\mu=0$ the short notation of $\Phi(x; \Sigma) = \Phi(x; 0, \Sigma)$ is used.

At least one embodiments of the present invention uses mean shift based algorithms for feature space analysis. Examples of such algorithms are found in, "An algorithm for data-driven bandwidth selection", by D. Comaniciu, appearing in IEEE Trans. Pattern Anal. Machine Intelligence., 25(2):281-288, 2 2003 and "Mean Shift: A robust approach toward feature space analysis", by D. Comaniciu and P. Meer, appearing in IEEE Trans. Pattern Anal. Machine Intelligence, 24(5):603-619, 2002. The contents of both of these references are fully incorporated herein by reference. An exemplary embodiment of a mean shift algorithm is summarized herein. Let $x_i$ be a set of points lying in a D-Dimensional feature space in joint spatial-range domain. Let H define a semi-positive definite and symmetric (SPDS) D×D smoothening matrix, where the matrix H also represents an analysis scale. The mean shift vector at x can be written as $$m(x; H) = \frac{\sum_i w_{x_i}(x; H) x_i}{\sum_i w_{x_i}(x; H)} - x \quad (2)$$

where $w_{x_i}(x; H) = \Phi(x-x_i; H) v(x_i)$. Here $\Phi$ is the D-dimensional Gaussian kernel defined earlier with the smoothing matrix H replacing $\Sigma$. Also, $v(x_i)$ is a weight associated with the point $x_i$ and is preferably equal to 1. The convergence properties of the mean shift vectors and partitions the feature space analysis using mean shift are such that the vectors point to the modes of the image. Thus, a mode seeking algorithm can be derived by iteratively computing the mean shift vectors. The feature space can then be partitioned into clusters by grouping together all data points converging to the same mode. As the partitioning of data depends on the smoothening matrix H, the data may be partitioned at different analysis scales and choosing the one which minimizes some criterion function. Assuming in the neighborhood of location x the signal can be approximated by a multivariate Gaussian distribution of mean $\mu$ and covariance $\Sigma$, then the normalized norm of the mean shift vector is maximized if the smoothening matrix H is equal to $\Sigma$.

Since in real life situations, the input signal may be multi-modal with asymmetric structures, the Gaussian approximation, discussed above, may not be valid. However, note that the approximation is locally valid in the neighborhood of each mode. Thus, a global estimate of $\mu$ and $\Sigma$ can be obtained by using the mean shift trajectories of all points converging to the same mode.

Consider a Gaussian input $f(x) = \Phi(x; \mu, \Sigma)$. Thus, equation (2) becomes $$m(x; H) = H \frac{\nabla \Phi(x; \mu, \sum + H)}{\Phi(x; \mu, \sum + H)} \quad (3)$$

Rewriting equation (3) as $$m(x; H) = -H(\Sigma + H)_{-1}(x - \mu)$$

$$\Sigma H^{-1} m(x; H) = \mu - x - m(x; H)$$

$$\Sigma H^{-1} a = b$$

where $a = m(x; H)$ and $b = \mu - x - m(x; H)$. For all m-points converging to the mode (or peak) $\mu$, we have $$\Sigma H^{-1} A = B$$

$$A^T H^{-T} \Sigma = B^T \quad (4)$$

with $A = [a_1 \ldots a_m]$ and $B = [b_1 \ldots b_m]$.

As μ represents the point of convergence (the location of the mode), we have to only solve for Σ. The solution of equation (4) for Σ is a non-linear semi-positive definite optimization and is found by minimizing equation (4) such that Σ ∈ SPDS (i.e. Σ is a semi-positive definite and symmetric matrix). An exemplary embodiment of how this problem maybe be solved using minimization of least area instead of using the classical least squares method is discussed in "Estimation of symmetric, positive definite matrices from imperfect measurements", by Y. Chen and J. E. McInroy, which appears in IEEE Transaction on Automatic Control, 47(10): 1721-1725, 2002 and is incorporated herein by reference and is fully incorporated by reference herein.

The minimum area criteria of equation (4) is represented as $$\min_{\Sigma \in PDS} \text{trace}\left[\left(A^T H^{-T} \sum - B^T\right)^T \left(A^T H^{-T} - B^T \sum{}^{-1}\right)\right] \quad (5)$$

where the trace function is known in the art. The solution of equation (5) is a Positive Definite Symmetric Matrix and can be use for Σ.

Figure 2:
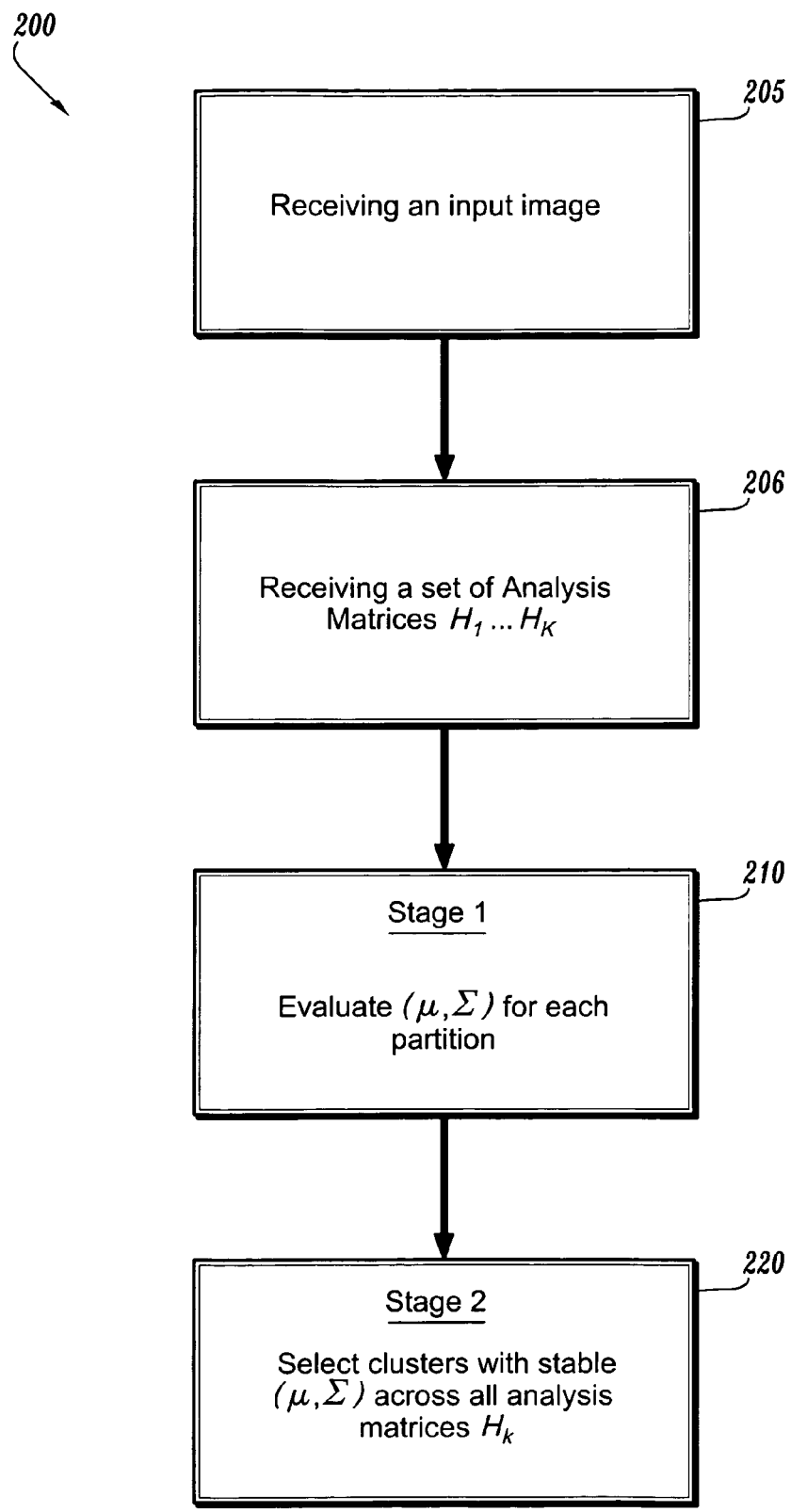
FIG. 2 is a flow diagram illustrating an exemplary Algorithm for the detection of local image structures accordance with the present invention.

An exemplary embodiment of the current invention is depicted in FIG. 2 and is indicated generally by reference numeral 200. It depicts the receiving, Block 205, and subsequent processing, Blocks 210 and 220, of an input image in order to detect the local image structures it contains. Block 206 depicts the step of receiving multiple analysis matrices that are used during processing, Blocks 210 and Blocks 220. After receeinging the input this exemplary embodiment of the current invention works in two stages, Blocks 210 and 220, and across multiple analysis scales $H_k$.

Figures 3A, 3B:
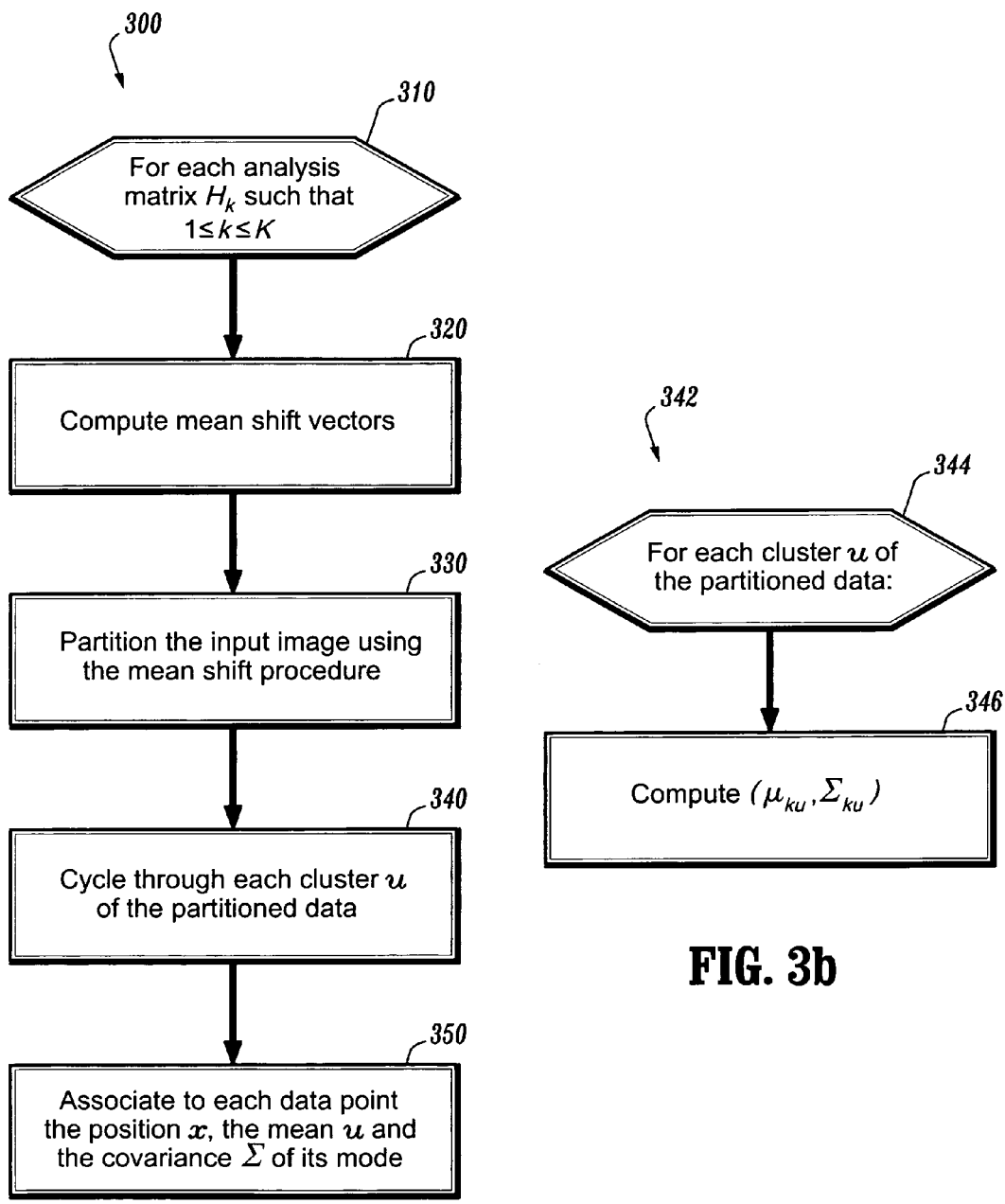

The first stage Block 210 is a partitioning stage, where the input image is partitioned into several clusters and their associated modes. It estimates the mean and local covariance matrix (μ,Σ) for each mode using equation (5) for each analysis scale. An exemplary embodiment is depicted in FIGS. 3a and 3b and indicated generally by reference numerals 300 and 342. The analysis at this stage is performed at multiple scales, Block 310. This multiple scale analysis is required if the structure underlying current mode is not Gaussian. In this case, as mentioned in earlier, the partition depends upon the analysis matrix H. Let $H_1, \ldots, H_K$ be a set of analysis matracies. The range of these matrices is assumed to be known a priori. In a simple case, $H_K = (h_k)^2 I$ where $k \in 1 \ldots K$, K represents the number of analysis bandwidths used, I is the identity matrix, and h is varied on a logarithmic scale with constant step; and where h is varied between two values that represent the size of the clusters being sought after. Thus, in first stage Block 210, the input signal is partitioned into different clusters, Blocks 320 and 330. Block 320, "Compute mean shift vectors," depicts calculating the mean shift vectors using the procedure discussed earlier. Block 330, "Partition the input image using the mean shift procedure", represents partitioning the input image into several clusters. The procedure is described in "Mean Shift: A robust approach toward feature space analysis", referenced earlier. Block 340, 344 and 346 represent the steps of cycling though each partitioned cluster and computing the (μ,Σ) of the mode associated with each cluster. Then, as depicted in block 350, each of data points of the input image is associated with the position x, mean μ, and covariance Σ of its mode. The initial iteration is performed for all the points in the feature space. The subsequent iterations of this step are performed for the points x associated with the modes found in the previous iteration.

Figures 4A, 4B:
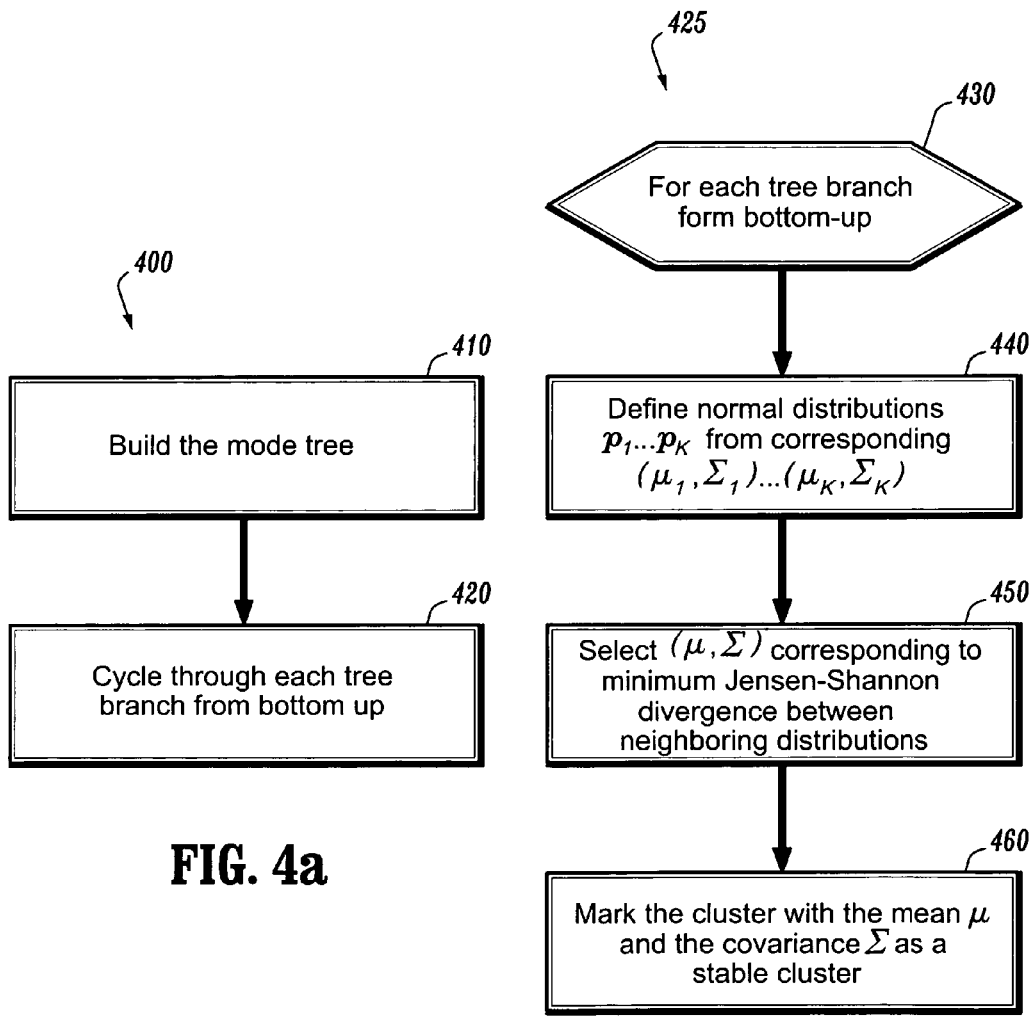

The second stage Block 220 works at the mode level. An exemplary embodiment of this step is depicted in FIGS. 4a and 4b and indicated generally by reference numerals 400 and 425. In the second stage all the modes that were found during the previous stage 210 are represented in a mode tree, Block 410.

Figure 6:
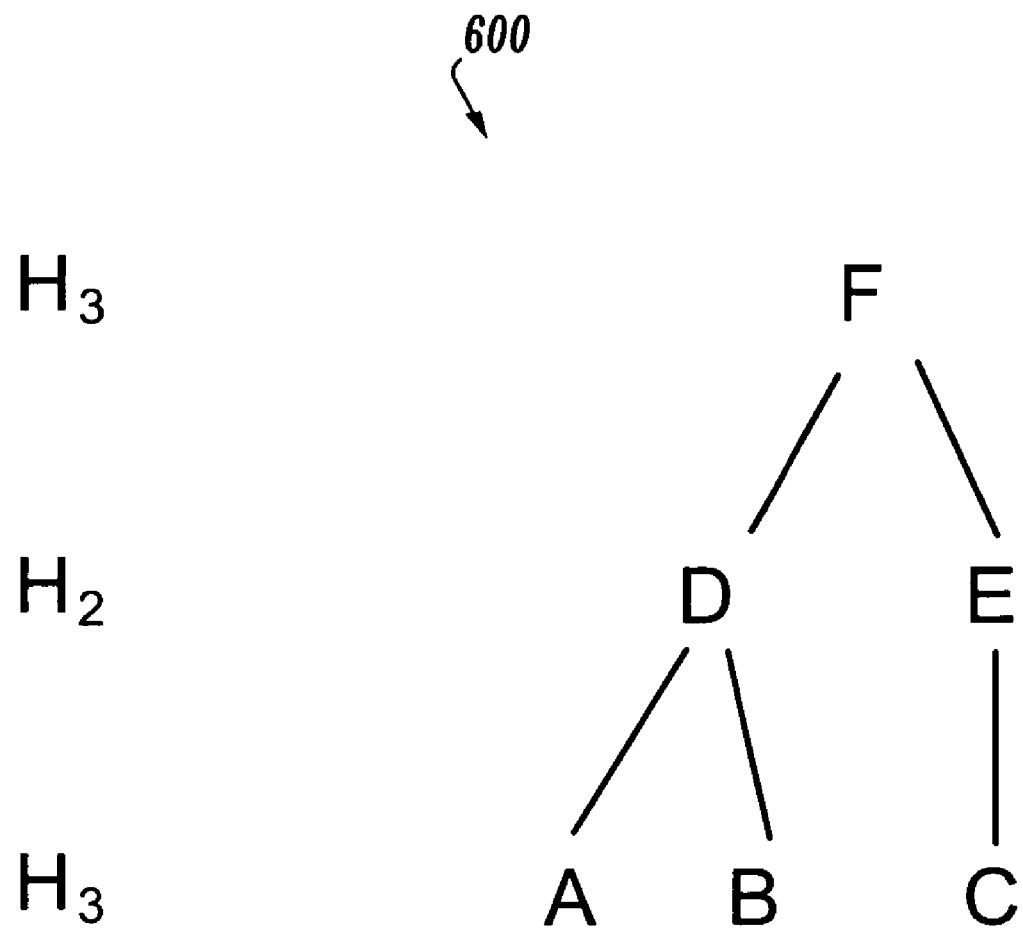
FIG. 6 is an exemplary embodiment of a mode tree.

An exemplary embodiment of a mode tree is depicted in FIG. 6 and is indicated generally by reference numeral 600. Letters A, B, C, D, E and F represent the different modes. Modes A, B and C were calculated during the fist iteration using analysis matrix $H_1$. Modes D and Σ were calculated during the second iteration using analysis matrix $H_2$ and Mode F was calculated analysis matrix $H_3$ during the last iteration. The top of the tree corresponds to the highest analysis matrix, $H_K$. Each level below the highest level corresponds to the next lower analysis matrix. Thus each level in the tree represents an iteration from the first stage, 210. As discussed earlier after the first iteration, the locations of the modes for the previous iteration are used to calculate the new modes with each subsequent iteration. Thus, it can be said that the modes of each iteration, after the first iteration, are derived from the modes of the immediately preceding iteration. Thus as depicted: Mode D was derived from Modes A and B; Mode E was derived from Mode C; and Mode F was derived from Modes D and E.

Referring back to the exemplary embodiments depicted in FIGS. 4a and 4b, each branch of the mode tree is selected one at a time and analyzed starting from the bottom, Block 420. This analysis is depicted in FIG. 4b and is indicated generally by reference numeral 425. Block 430 depicts a loop that selects each branch of the mode tree, one at a time. Block 440 depicts denoting $(\mu_1, \Sigma_1), \ldots, (\mu_K, \Sigma_K)$ to represent the mean and covariance associated with each mode in the selected branch and defining a Gausian representation, $p_1, \ldots, p_K$, for each denoted (μ, Σ) pair, where the subscript 1 represents a mode associated with the bottom of the mode tree and the subscript K resents a mode associated with the top of the mode tree. Block 450 depicts the step of starting from the bottom of the selected branch for each mode in the domain of input signal f, and selecting the most stable mean and covariance matrix across the selected tree branch, from the bottom up. The stability of a mode at analysis level $k \in 1 \ldots K$ is measured by computing the overall dissimilarity of $p_K$ and its w neighbors, preferably 1 neighbor, across scale $p_{k-w} \ldots p_{k-1}$, $p_{k+1} \ldots p_{k+w}$ and selecting the (μ, Σ) associated with the lowest dissimilarity. The dissimilarity is measured using a specialized version of Jensen-Shannon divergence. For D-dimensional Gausian distributions $p_j$, where $j \in 1 \ldots J$, Jensen-Shannon divergence is described as $$JS(p_1 \ldots p_J) = \frac{1}{2}\log\frac{\left|\frac{1}{J}\sum_{j=1}^{J}\sum_{j}\right|}{\sqrt[J]{\prod_{j=1}^{J}|\Sigma_j|}} + \quad (6)$$

$$\frac{1}{2}\sum_{j=1}^{J}(\mu_j - \mu)^T\left(\sum_{j=1}^{J}\sum_{j}\right)^{-1}(\mu_J - \mu)$$

where $p_1 \ldots p_J$ represents the calculation of dissimilarity for $p_K$ and its w neighbors and both the vector $\mu_j$ and matrix $\Sigma_j$ represent the mean, covariance associated with the Gausian $p_j$ and where the vector $$\mu = \frac{1}{J}\sum_{j=1}^{J}\mu_j.$$

Block 460 represents the step of marking or selecting the cluster of data points $x_i$ with the most stable $\mu$ and $\Sigma$ as a stable cluster. As a cluster is composed of the data points x in the joint spatial-range domain, a cluster associated with a mode associated with a particular $\mu$ and $\Sigma$ help define local image structures.

Another exemplary embodiment of the current invention is depicted below in

TABLE 1

Figure 5A:
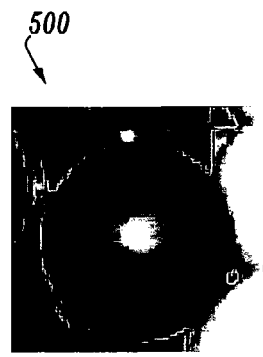
FIG. 5a is an image whose local structures will be identified by an exemplary embodiment of the current invention.
Figure 5B:
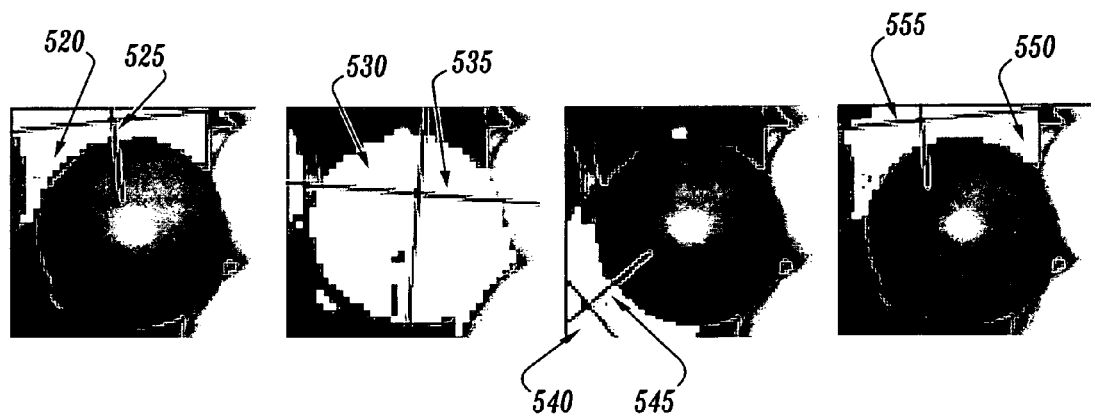
Figure 5B:
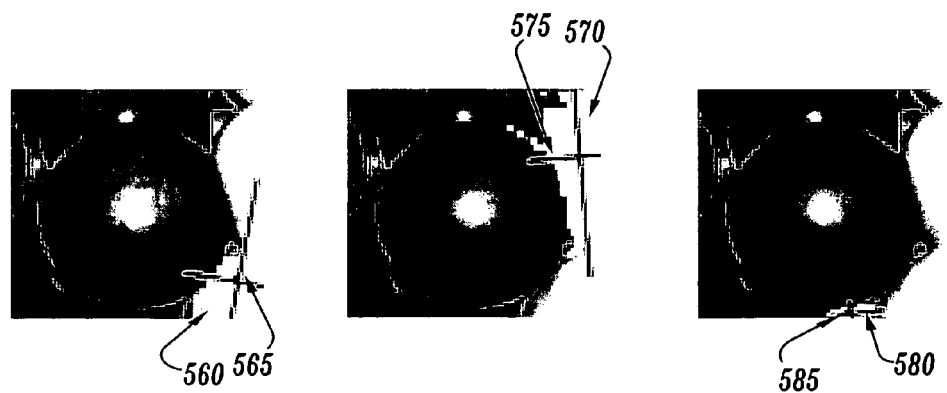

Table 1 An exemplary embodiment of Algorithm for Local Image Structure Detection {Perform first stage: evaluate $(\mu,\Sigma)$ for each partition}
for each analysis matrices $H_k$ such that $1 \leq k \leq K$ do
    compute the mean shift vectors using equation (2)
    partition the signal using mean shift procedure
    for each cluster u of the partitioned data do
        compute $(\mu_{ku},\Sigma_{ku})$ using equation (5)
    end for
    associate to each data point the position x, the mean $\mu$
and covariance $\Sigma$ of its mode
    end for
{End of first stage}
{Perform second stage: select clusters with stable $(\mu,\Sigma)$
across all analysis matrices $H_k$}
    Build the mode tree
    for each tree branch from bottom-up do
        define normal distributions $p_1 \ldots p_K$ from
        corresponding $(\mu_1,\Sigma_1) \ldots (\mu_K,\Sigma_K)$
        select $(\mu,\Sigma)$ corresponding to minimum
        Jensen-Shannon divergence
between neighboring distributions
        mark the cluster with mean $\mu$ and covariance $\Sigma$ as
        a stable cluster
    end for FIGS. 5a and 5b depict the results of an exemplary embodiment of the current invention. FIG. 5a was is a test color input image, which was analyzed. FIG. 5b depicts the clusters 520, 530, 540, 550, 560, 570 and 580 extracted from the test image shown in FIG. 5a. The crosses 525, 535, 545, 555, 565, 575 and 585 depict the eigendirections of the covariance matrix in the spatial dimensions and its size is proportional to the eigenvalues of the covariance. The analysis was performed for a scale range of 5-15 in the spatial domain, with a ratio of 1.1 between two consecutive scales.

The subject matter of the current invention allows for the detection of stable structures in a given feature space and has several applications. These include, but are not limited to medical image segmentation, motion segmentation and the recovery of general image structure.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It should also be understood that the above description is only representative of illustrative embodiments. Other applications and embodiments can be straightforwardly implemented without departing from the spirit and scope of the present invention. It is therefore intended, that the invention not be limited to the specifically described embodiments, but the invention is to be defined in accordance with that claims that follow.

What is claimed:

1. A method for detection of local image structures represented as clusters in a joint-spatial range domain, comprising:
    receiving an input image made having one or more clusters in a joint-spatial range domain, and each of the one or more clusters having a corresponding mode;
    receiving a set of analysis matrices;
    selecting through each one of the analysis matrices,
        using the selected analysis matrix to partition the input image into the one or more clusters and their corresponding modes, and
        computing a mean, $\mu$, and a local covariance matrix $\Sigma$ for each of the corresponding modes of each of the one or more clusters;
    building a mode tree with at least one branch having a plurality of leaves, each leaf representing a respective one of the modes and the corresponding cluster, and
    cycling through each branch of the mode tree and selecting at least one of the one or more clusters corresponding to the modes represented by the plurality of leaves, wherein each selected cluster has a stable mean and stable covariance matrix across the set of analysis matrices, and each of the selected clusters is indicative of a local image structure.

2. A method as defined in claim 1, wherein the step of using the selected analysis matrix to partition the input image comprises:
    computing a plurality of mean shift vectors using the selected analysis matrix; and
    partitioning the input image into the one or more clusters using the plurality of mean shift vectors, the selected analysis matrix and a mean shift procedure.

3. A method as defined in claim 2, wherein the step of computing a plurality of mean shift vectors using the selected analysis matrix comprises calculating each mean shift vector using the following equation $$m(x;H) = \frac{\sum_i w_{x_i}(x;H)x_i}{\sum_i w_{x_i}(x;H)} - x$$

where m(x, H) is the mean shift vector calculated at a point vector x of the input image, H is the selected analysis matrix, vector $x_i$ represents a data point that makes up the input image, i is an index representing all the data points in the input image, $w_{xi}(x, H)=\Phi(x-x_i, H)v(x_i)$, $\Phi$ is the D-dimensional Gausian kernel, and $v(x_i)$ is a weight associated with the point $x_i$.

4. A method as defined in claim 3, wherein $v(x_i)=1$.

5. A method as defined in claim 1, wherein the set of analysis matrices comprises:
    the matrices $H_k$, where $H_k=(h_k)^2*I$, k is an index, I is the identity matrix, and $h_k$ is varied between two values.

6. A method as defined in claim 5, where $h_k$ is varied on a logarithmic scale by a constant step.

7. A method as defined in claim 1 wherein, the mean, $\mu$, and the local covariance matrix $\Sigma$ are computed by calculating $$\min_{\Sigma \in PDS} \text{trace}\left[\left(A^T H^{-T}\sum - B^T\right)^T \left(A^T H^{-T} - B^T \sum^{-1}\right)\right]$$

where, $\Sigma$ is a Positive Definite Symmetric local covariance matrix, H is the selected analysis matrix, A is a matrix of at least one mean shift vector at a point x, and B is a matrix of at least one vector calculated by subtracting the point x and the mean shift vectors at point x from the mean $\mu$.

8. A method as defined in claim 1, wherein the step of selecting through each one of the analysis matrices, using the selected analysis matrix to partition the input image, and computing a mean $\mu$ and a local covariance matrix $\Sigma$ for each of the corresponding modes, further comprises the step of associating to each of the data points of each of the one or more clusters with the position x, the mean $\mu$ and the covariance matrix $\Sigma$ of the mode of each of the one or more clusters.

9. A method as defined in claim 1, wherein
each leaf also having the mean $\mu$ and the covariance matrix $\Sigma$ associated with the mode wherein the step of selecting at least one of the one or more clusters comprises;
selecting each branch of the mode tree one at a time, and for each selected branch
defining a set of Gaussian distributions $p_1 \ldots p_K$ from the corresponding $(\mu 1, \Sigma 1) \ldots (\mu K, \Sigma K)$ associated with each one of the leaves that make up the branch;
selecting the $(\mu, \Sigma)$ corresponding to a stable distribution of $p_1 \ldots p_K$; and
selecting the cluster associated with the stable mean $\mu$ and the stable covariance $\Sigma$.

10. A method as defined in claim 9 wherein, selecting the $(\mu, \Sigma)$ corresponding to a stable distribution of $p_1 \ldots p_K$ comprises:
selecting the $(\mu, \Sigma)$ corresponding to a minimum Jensen-Shannon divergence between neighboring Gausian distributions calculated using $$JS(p_1 \ldots p_J) = \frac{1}{2}\log\frac{\left|\frac{1}{J}\sum_{j=1}^{J}\Sigma_j\right|}{\sqrt[J]{\prod_{j=1}^{J}|\Sigma_j|}} + \frac{1}{2}\sum_{j=1}^{J}(\mu_j - \mu)^T\left(\sum_{j=1}^{J}\Sigma_j\right)^{-1}(\mu_j - \mu)$$

where $p_1 \ldots p_J$ are the neighboring Gausian distributions, J is the number of the neighboring Gausian Distributions, vector $\mu_J$ is the mean associated with the Gausian distribution, matrix $\Sigma_J$ is the covariance of the Gausian distribution and the vector $\mu$ representing the average of all the means associated with the neighboring Gausian distributions.

11. A method as defined in claim 10 wherein one neighboring Gausian Distribution is used.

12. A program storage device readable by machine, tangibly embodying a program of instructions executable by the machine to perform a method for detection of local image structures represented as clusters in a joint-spatial range domain, the method comprising:
receiving an input image made having one or more clusters in a joint-spatial range domain, and each of the one or more clusters having a corresponding mode;
receiving a set of analysis matrices;
selecting through each one of the analysis matrices, using the selected analysis matrix to partition the input image into the one or more clusters and their corresponding modes, and
computing a mean, $\mu$, and a local covariance matrix $\Sigma$ for each of the corresponding modes of each of the one or more clusters;
building a mode tree with at least one branch having a plurality of leaves, each leaf representing a respective one of the modes and the corresponding cluster, and
cycling through each branch of the mode tree and selecting at least one of the one or more clusters corresponding to the modes represented by the plurality of leaves,
wherein each selected cluster has a stable mean and stable covariance matrix across the set of analysis matrices, and each of the selected clusters is indicative of a local image structure.

13. A program storage device as defined in claim 12, wherein the step of using the selected analysis matrix to partition the input image comprises:
computing a plurality of mean shift vectors using the selected analysis matrix; and
partitioning the input image into the one or more clusters using the plurality of mean shift vectors, the selected analysis matrix and a mean shift procedure.

14. A program storage device as defined in claim 13, wherein the step of computing a plurality of mean shift vectors using the selected analysis matrix comprises calculating each mean shift vector using the following equation $$m(x; H) = \frac{\sum_i w_{x_i}(x; H)x_i}{\sum_i w_{x_i}(x; H)} - x$$

where $m(x, H)$ is the mean shift vector calculated at a point vector x of the input image, H is the selected analysis matrix, vector $x_i$ represents a data point that makes up the input image, i is an index representing all the data points in the input image, $w_{x_i}(x, H) = \Phi(x - x_i, H)v(x_i)$, $\Phi$ is the D-dimensional Gausian kernel, and $v(x_i)$ is a weight associated with the point $x_i$.

15. A program storage device as defined in claim 14, wherein $v(x_i) = 1$.

16. A program storage device as defined in claim 12, wherein the set of analysis matrices comprises:
the matrices $H_k$, where $H_k = (h_k)^2 * I$, k is an index, I is the identity matrix, and $h_k$ is varied between two values.

17. A program storage device as defined in claim 16, where $h_k$ is varied on a logarithmic scale by a constant step.

18. A program storage device as defined in claim 12, wherein the mean, $\mu$, and the local covariance matrix $\Sigma$ are computed by calculating $$\min_{\Sigma \in PDS} \text{trace}\left[(A^T H^{-T}\Sigma - B^T)^T(A^T H^{-T} - B^T \Sigma^{-1})\right]$$

where, $\Sigma$ is a Positive Definite Symmetric local covariance matrix, H is the selected analysis matrix, A is a matrix of at least one mean shift vector at a point x, and B is a matrix of at least one vector calculated by subtracting the point x and the mean shift vectors at point x from the mean $\mu$.

19. A program storage device as defined in claim 12, wherein the step of selecting through each one of the analysis matrices, using the selected analysis matrix to partition the input image, and computing a mean $\mu$ and a local covariance matrix $\Sigma$ for each of the corresponding modes, further comprises the step of associating to each of the data points of each of the one or more clusters with the position x, the mean μ and the covariance matrix Σ of the mode of each of the one or more clusters.

20. A program storage device as defined in claim 12, wherein each leaf also having the mean μ and the covariance matrix Σ associated with the mode, wherein the step of selecting at least one of the one or more clusters, comprises:

selecting each branch of the mode tree one at a time, and for each selected branch defining a set of Gausian distributions $p_1 \ldots p_K$ from the corresponding $(\mu 1, \Sigma 1) \ldots (\mu K, \Sigma K)$ associated with each one of the leaves that make up the branch;

selecting the (μ,Σ) corresponding to a stable distribution of $p_1 \ldots p_K$; and selecting the cluster associated with the stable mean μ arid the stable covariance Σ.

21. A program storage device as defined in claim 20, wherein, selecting the (μ,Σ) corresponding to a stable distribution of $p_1 \ldots p_K$ comprises:

selecting the (μ,Σ) corresponding to a minimum Jensen-Shannon divergence between neighboring Gausian distributions calculated using $$JS(p_1 \ldots p_J) = \frac{1}{2}\log\frac{\left|\frac{1}{J}\sum_{j=1}^{J}\Sigma_j\right|}{\sqrt[J]{\prod_{j=1}^{J}|\Sigma_j|}} + \frac{1}{2}\sum_{j=1}^{J}(\mu_j - \mu)^T\left(\sum_{j=1}^{J}\Sigma_j\right)^{-1}(\mu_j - \mu)$$

where $p_1 \ldots p_J$ are the neighboring Gaussian distributions, J is the number of the neighboring Gaussian Distributions, vector $\mu_J$ is the mean associated with the Gaussian distribution, matrix $\Sigma_J$ is the covariance of the Gaussian distribution and the vector μ representing the average of all the means associated with the neighboring Gausian distributions.

22. A method as defined in claim 21 wherein one neighboring Gaussian Distribution is used.

* * * * *